United States Patent
Lesczynski et al.

(10) Patent No.: US 6,183,236 B1
(45) Date of Patent: Feb. 6, 2001

(54) LENS HYDRATION APPARATUS AND METHOD

(75) Inventors: Michael A. Lesczynski, Honeoye Falls; Kevin D. Beebe, Spencerpot, both of NY (US)

(73) Assignee: Bausch & Lomb Incorporated, Rochester, NY (US)

( * ) Notice: Under 35 U.S.C. 154(b), the term of this patent shall be extended for 0 days.

(21) Appl. No.: 09/557,121

(22) Filed: Apr. 24, 2000

Related U.S. Application Data

(62) Division of application No. 09/146,367, filed on Sep. 3, 1998, now Pat. No. 6,068,798.

(51) Int. Cl.$^7$ .................................................. B29D 11/00
(52) U.S. Cl. ..................... 425/445; 134/22.1; 134/901; 425/446
(58) Field of Search ..................... 264/2.6, 1.1; 425/445, 425/446; 134/22.1, 186, 169 R, 901

(56) References Cited

U.S. PATENT DOCUMENTS

| | | | |
|---|---|---|---|
| 5,080,839 | 1/1992 | Kindt-Larsen | 264/2.6 |
| 5,094,609 | 3/1992 | Kindt-Larsen | 425/445 |
| 5,264,161 | 11/1993 | Druskis et al. | 264/2.6 |
| 5,271,875 | 12/1993 | Appleton et al. | 264/2.3 |
| 5,476,111 | 12/1995 | Andersen et al. | 134/58 R |
| 5,616,184 | 4/1997 | Duncan et al. | 134/22.1 |
| 5,722,536 | 3/1998 | Pierce et al. | 206/5.1 |

FOREIGN PATENT DOCUMENTS

824063 A2  2/1998  (EP) .

Primary Examiner—Mathieu D. Vargot

(57) ABSTRACT

An apparatus and method for hydrating is provided for hydrating a lens and extracting residual materials from the lens. The apparatus includes a shaft; multiple arms extending radially from a lower end of the shaft about a central axis in a star-shaped pattern, each arm including a fin extending therebelow such that multiple fins also extend radially with respect to said central axis, wherein the fins including lower outer edges that converge and form a nozzle face. A fluid transport passage extends through the shaft and terminates at an opening in the nozzle face, whereby fluid can be evacuated from the lens through this passage. Preferably, at least one recessed channel is formed in the nozzle face where the fins converge, wherein each of these channels extends from the opening in the nozzle face that forms a terminus of the fluid transport passage to a space between two adjacent fins. The lower outer edges of the fins have an arcuate surface, the arcuate surfaces forming a convex-shaped nozzle face. Preferably, the outer tips of the arms extend radially from the central axis of the apparatus further than the fins extend.

8 Claims, 2 Drawing Sheets

LENS HYDRATION APPARATUS AND METHOD

This is a Divisional Application of U.S. Ser. No. 09/146,367 filed on Sep. 3, 1998 now U.S. Pat. No. 6,068,798.

BACKGROUND OF THE INVENTION

This invention relates to an apparatus for hydrating and extracting residual materials from a lens, especially a contact lens, and methods employing the apparatus.

Soft, hydrogel contact lenses are produced by polymerizing a monomeric mixture comprising a hydrophilic monomer and a crosslinking agent. The monomeric mixture can be cast directly into lenses by static cast molding or spin-casting methods, where the liquid monomeric mixture is charged to the mold and is then cured, typically by subjecting the monomeric mixture to UV radiation, heat or both. Alternately, the monomeric mixture can first be cured in the form of cylindrical blanks (also referred to in the art as "buttons"), which buttons are then lathe cut into lenses, or buttons can be cut from rods or sheet of cured lens material for lathe cutting into lenses.

Regardless of the manner of forming the lens, following polymerization (or curing) of the monomeric mixture such soft lenses are typically hydrated by exposure to water or an aqueous solution under appropriate conditions that the lens-shaped article absorbs and retains water to form a hydrogel. Also, the lenses are typically treated to extract undesired residual materials remaining in the lens from the polymerization process. Such extractibles may include incompletely polymerized monomers, oligomers formed from the curing process, and any diluent or solvent present in the initial monomeric mixture. The extraction may be performed as a process step separate from the hydration process, or these two processes may be performed simultaneously.

As an example, U.S. Pat. No. 5,271,875 discloses a method of static cast molding lenses in a mold assembly composed of anterior and posterior mold sections. The method includes introducing monomeric mixture to the mold assembly, curing the monomeric mixture to form a lens, and recovering the lens and hydrating the lens to form a soft hydrogel lens. U.S. Pat. No. 5,271,875 illustrates two general methods of recovering the lens from the mold and hydrating the lens. First, in a "wet release" process, the lens is hydrated while retained in a mold section, the hydration process also facilitating removal of the lens from the mold section in which it is retained. Second, in a "dry release" process, the lens is first disengaged from the mold section in which it is retained by a force applied by a mechanical fixture, whereby the lens is hydrated after removal from the mold. U.S. Pat. No. 5,264,161 also discloses a "wet release" method of recovering a lens, where a contact lens and the mold in which it is retained are added to an aqueous bath including a surfactant.

SUMMARY OF THE INVENTION

This invention provides an apparatus and method for hydrating a lens whereby residual materials are also extracted from the lens. The apparatus comprises multiple arms extending radially from a lower end of a shaft about a central axis in a star-shaped pattern, preferably at least four arms, each arm including a fin extending therebelow such that multiple fins also extend radially with respect to the central axis. Lower outer edges converge and form a nozzle face. A fluid transport passage extends through the shaft and terminates at an opening in the nozzle face where the lower outer edges of the fins converge, whereby fluid can be evacuated from the lens through an opening in the nozzle face and this passage. Preferably, at least one recessed channel is formed in the nozzle face where the fins converge, wherein each of these channels extends from the opening in the nozzle face that forms a terminus of the fluid transport passage to a space between two adjacent fins. According to preferred embodiments, the lower outer edges of the fins have an arcuate surface, the arcuate surfaces forming a convex-shaped nozzle face. Preferably, the outer tips of the arms extend radially from the central axis of the apparatus further than the fins extend.

The method involves, after introducing water or an aqueous solution to a well containing the lens, placing such a nozzle assembly proximate to a lens, and evacuating the water or aqueous solution via the opening in the nozzle face and the fluid transport passage. This cycle of introducing and evacuating the liquid to the well and lens can be repeated as necessary to fully hydrate the lens and extract residual materials from the lens. The lens may be retained in the concave well of its intended final package during this hydration and extraction process.

DETAILED DESCRIPTION OF VARIOUS PREFERRED EMBODIMENTS

Figure 1:
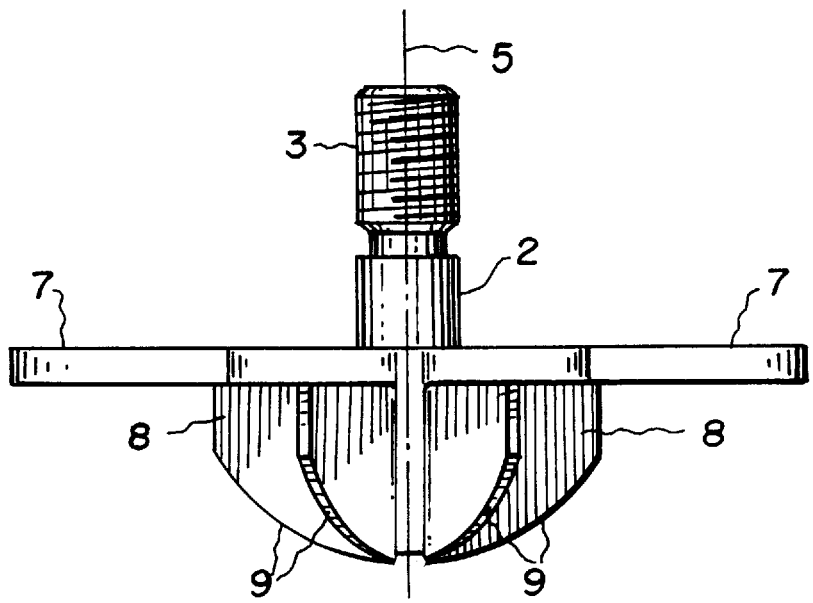
FIG. 1 is a side view of a nozzle assembly according to various preferred embodiments of the invention.

Referring to the drawing figures, the apparatus includes shaft 2 which, for the described embodiment, includes an upper threaded portion 3 for mounting in a support. As shown schematically in FIG. 4, upper portion 3 is mounted in a support 4, however, the specific manner of supporting the apparatus can be adapted to accommodate a particular manufacturing arrangement.

Shaft 2 has central axis 5. Radiating from this axis are a plurality of arms 7 in a star-like arrangement. The lower portions of each arm include fins 8. Lower outer edges 9 of the fins form a face of the nozzle; preferably, lower outer edges 9 are arcuately shaped so as to form a convex shaped nozzle face. A central passage 10 extends through shaft 2 (and support 4) to opening 11 in the nozzle face, opening 11 being located where edges 9 of the fins converge. The upper end of central passage 10 is connected to a pump, described in more detail below. Arms 7 preferably extend radially further from central axis 5 than fins 8 extend.

Figure 4:
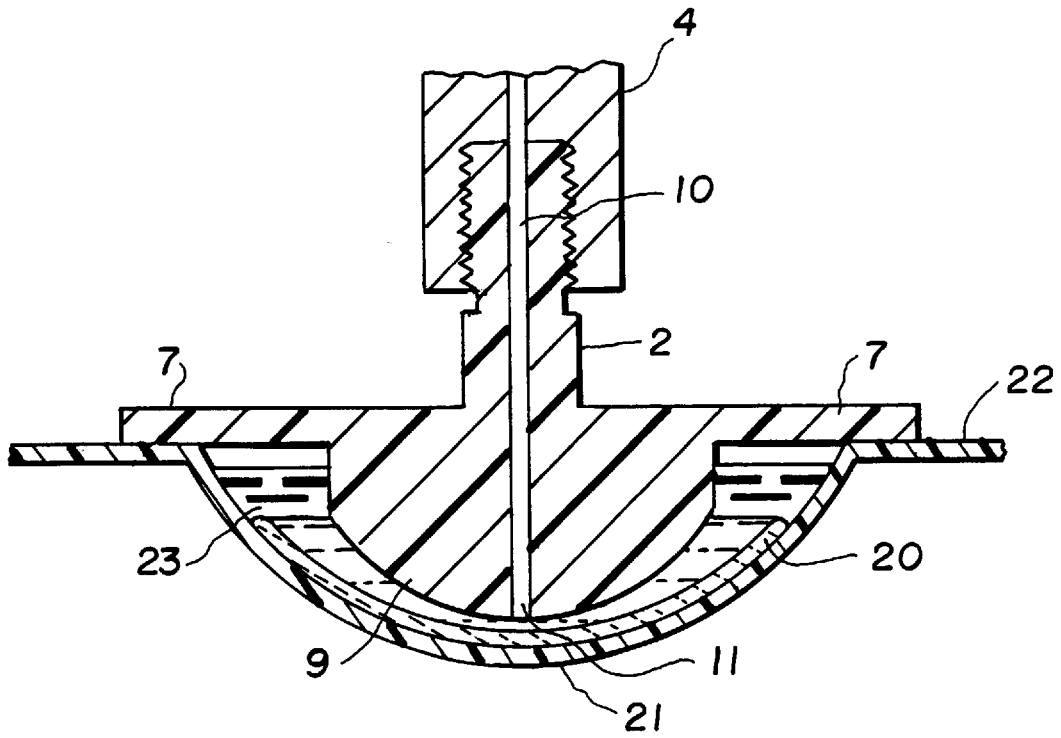
FIG. 4 is a cross-sectional view of the nozzle assembly of FIG. 1, taken along line 30—30 of FIG. 2, with the nozzle assembly positioned proximate a contact lens in its receptacle.
Figure 2:
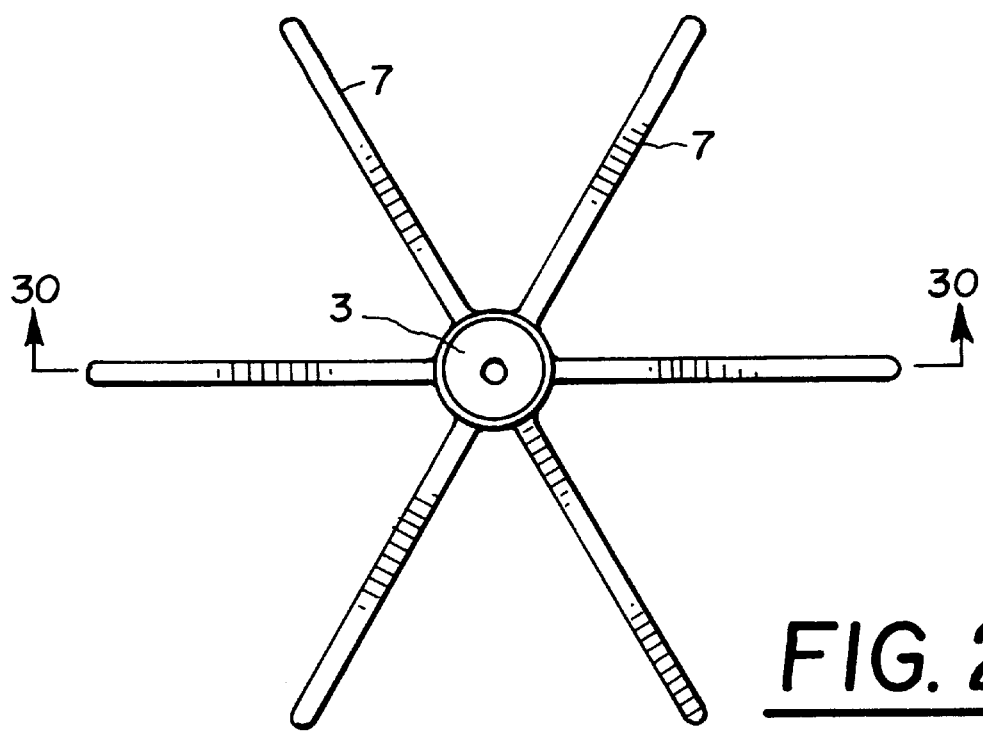
FIG. 2 is a top view of the nozzle assembly of FIG. 1.
Figure 3:
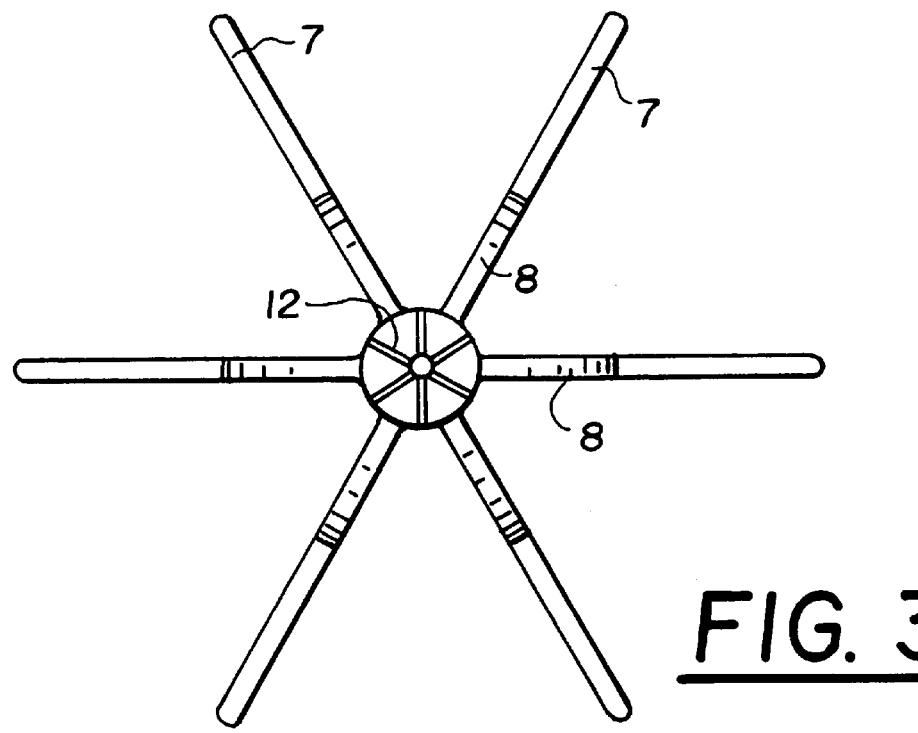
FIG. 3 is a bottom view of the nozzle assembly of FIG. 1.

As seen in FIG. 4, a contact lens 20 is retained in a concave well 21. Concave well 21 can be part of any receptacle desired to hold lens 20 for processing. As an example, a plurality of concave wells can be formed in a tray, i.e., a tray composed of a planar surface having a plurality of concave indentations therein. As another example, well 21 can be a portion of a contact lens blister package, such as the package described in U.S. Pat. No. 5,722,536, the disclosure of which is incorporated herein by reference. In any event, for the described embodiment, the periphery of well 21 is surrounded by planar surface 22. It is noted that well 20 does not need to be spherically shaped, for example, well 20 could be generally spherically shaped with a flat portion on its bottom. It is preferred, however, that the nozzle face formed by edges 9 of fins 8 closely approximates the shape of the well. Accordingly, in the case where the concave lens-holding receptacle has a shape different than that shown in FIG. 4, the nozzle face can have a shape different than that illustrated for the described embodiment. Generally, however, edges 9 will form a convex-shaped nozzle face.

Referring again to FIG. 4, the nozzle face has been placed proximate to lens 20 held in well 21, for example, by lowering the nozzle assembly until arms 7 contact planar surface 22. As seen in FIG. 4, a slight gap exists between the nozzle face and the bottom of well 21. This contact of arms 7 with surface 22 serves to steady the receptacle, and also ensures this gap between the nozzle face and the bottom of the well exists. It is noted that it is not necessary for the center of the lens to be aligned with opening 11 with the described apparatus.

For the described embodiment, a metered amount of water or an aqueous solution (such as saline solution) has been introduced to the lens and well 21, for example, by an injector. The amount of liquid 23 present in well 21 should be sufficient to fully immerse the lens without overflowing the well. After having allowed a few minutes for the lens to absorb the liquid, the nozzle assembly is lowered to assume the position shown in FIG. 4. Then, excess liquid is evacuated through opening 11. For this purpose, an upper end of passage 10 is connected to a pump, such as a positive displacement pump.

Recessed channels 12 extend between the fins. More specifically, channels 12 extend from opening 11 to the space between adjacent fins. During the aforementioned evacuation of liquid from well 21, the wetted lens will tend to adhere to well 21. However, in some cases, the lens will not remain adhered to the well during this evacuation step, especially in the area closest to opening 11; instead, the lens may get drawn up against the nozzle face. Channels 12, in conjunction with fins 8, ensure that liquid can still be evacuated. In other words, the lens is prevented from blocking opening 11, as the liquid is able to pass through channels 12 from the spacing between adjacent fins. As shown in the illustrated embodiment, it is preferred that a channel is provided between each adjacent pairs of fins; thus, for the illustrated embodiment with six fins, there are also six channels, one channel located between each two adjacent fins.

For the described embodiment where the liquid has been introduced into well 21 prior to lowering the nozzle assembly in the position shown in FIG. 4, it may be desirable to engage the pump prior to lowering the nozzle assembly so that the evacuation of liquid begins immediately when the nozzle face contacts the liquid. This avoids the nozzle assembly displacing liquid in the well whereby the liquid overflows the well.

The steps of introducing the liquid to the lens and well, and evacuating the liquid therefrom with the described nozzle assembly, may be repeated until undesired residual materials remaining in the lens from the polymerization process are extracted and the lens has been hydrated. For example, after completing the initial evacuation of liquid, the well can be positioned proximate an injector where fresh liquid is introduced into the well; then, the well can again be positioned proximate the nozzle assembly for evacuation of this liquid, after having allowed the liquid to remain in contact with the lens for a few minutes. The liquid introduced to the lens and well may be heated if desired, as heated liquid may speed up the hydration and extraction of the lens, i.e., shorten the time between introduction and evacuation of liquid. Also, since it is conventional to package soft contact lenses in saline solution (such packaging solutions also optionally including a surfactant or a buffer), a packaging solution can then be introduced to the well and lens after the extraction and hydration is complete. For example, well 21 and lens 20 can be transferred to another station for dispensing of the final packaging solution.

If desired, the nozzle assembly of this invention may be connected to a reversible pump and a source of the liquid. In this case, a metered amount of liquid can be introduced to the well directly via opening 11 passage 10. After allowing the lens to remain immersed in the liquid, the liquid can be evacuated with opening 11.

Although preferred embodiments of the invention have been described, various other alternate embodiments and variations of the present invention will be evident to one skilled in the art.

We claim:

1. An apparatus for hydrating and extracting residual materials from a lens held in a concave well comprising:
   a shaft;
   multiple arms extending radially from a lower end of the shaft about a central axis in a star-shaped pattern, each arm including a fin extending therebelow such that multiple fins also extend radially with respect to said central axis, the fins including lower outer edges that converge and form a nozzle face, wherein outer tips of said arms extend radially from said central axis further than said fins extend radially from said central axis;
   a fluid transport passage extending through the shaft and terminating at an opening in the nozzle face; and
   at least one recessed channel formed in the nozzle face where the fins converge, each of said at least one channels extending from the opening in the nozzle face that forms a terminus of the fluid transport passage to a space between two adjacent fins.

2. The apparatus of claim 1, wherein each of the lower outer edges of the fins have an arcuate surface, the arcuate surfaces forming a convex-shaped nozzle face.

3. The apparatus of claim 1, wherein said central axis corresponds to a central axis of said shaft.

4. The apparatus of claim 3, wherein the fluid transport passage extends along said central axis.

5. The apparatus of claim 1, comprising at least four arms.

6. The apparatus of claim 5, composed of six arms.

7. The apparatus of claim 1, wherein one of said channels extends between each pair of adjacent fins.

8. The apparatus of claim 1, wherein an upper end of said central passage is attached to a positive displacement pump for evacuating liquid through said passage.

* * * * *